UNITED STATES PATENT OFFICE.

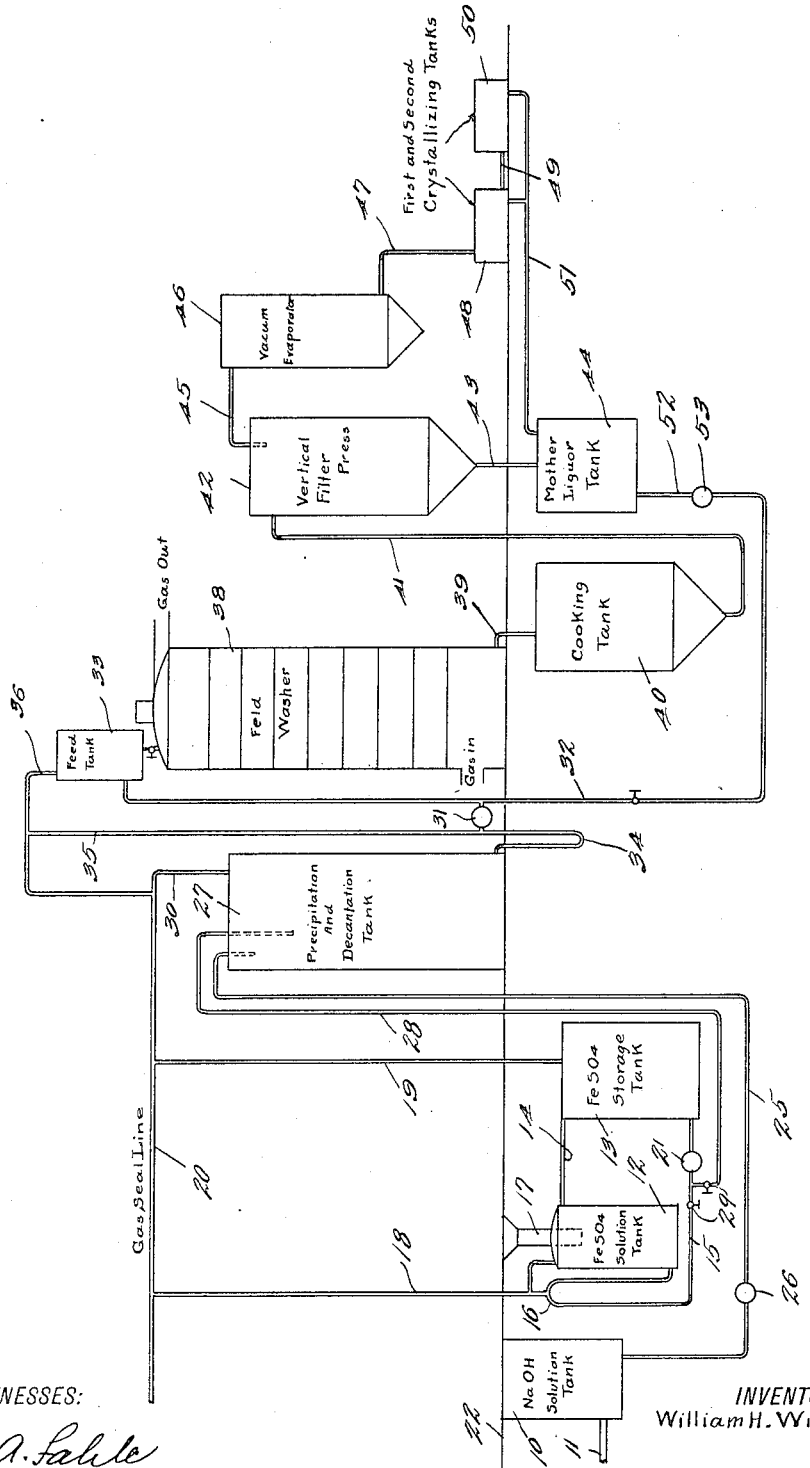

WILLIAM H. WRIGHT, OF INDIANAPOLIS, INDIANA.

PROCESS OF MAKING CYANID.

1,259,702. Specification of Letters Patent. Patented Mar. 19, 1918.

Application filed February 17, 1917. Serial No. 149,270.

*To all whom it may concern:*

Be it known that I, WILLIAM H. WRIGHT, a citizen of the United States, residing at Indianapolis, in the county of Marion and State of Indiana, have invented a new and useful Process of Making Cyanid, of which the following is a specification.

In the recovery of cyanogen in the manufacture of illuminating gas, it is desirable to obtain all the cyanogen as directly as possible in the form of a pure soluble cyanogen salt of definite composition. Ordinarily, this salt is most conveniently the ferrocyanid of an alkali metal, preferably sodium or potassium or sometimes ammonium.

Various processes have been used for doing this. According to one, solutions of potassium or sodium carbonate (or hydrate) and ferrous sulfate are combined to produce a ferrous hydrate sludge, with the setting free of carbonic acid if the carbonate of the alkali is used, and with the formation of sodium sulfate, which remains in solution and is removed by decantation. The ferrous hydrate sludge is then mixed with an additional amount of a solution of an alkali carbonate or hydrate and held in suspension thereby, and this mixture is then exposed in a washer to the cyanogen-containing gas, which also always contains hydrogen sulfid. The hydrogen sulfid combines with the ferrous hydrate to form ferrous sulfid and water. The ferrous sulfid and the alkali carbonate or hydrate then combine with the cyanogen (in the form of hydrocyanic acid) to form the alkali ferrocyanid, water, and hydrogen sulfid, together with carbonic acid if the carbonate of the alkali was used.

However, as this process has been carried out for years, having been first suggested by Bruennquell in 1856, these reactions have always been accompanied by the formation of certain insoluble cyanogen salts, which though not lost yet required additional treatment in order to be converted into the soluble ferrocyanid. This additional treatment is troublesome and expensive. The proportion of the cyanogen which thus passed into insoluble cyanogen salts varied from 15 to 33 per cent., which required retreatment.

The formation of these insoluble cyanogen salts is due practically wholly to the oxidation of the ferrous compounds used into ferric compounds, which ferric compounds react with the cyanogen to produce insoluble compounds instead of the soluble ferrocyanid which is produced by the ferrous compounds.

Attempts have been made hitherto to avoid the formation of these insoluble cyanogen compounds. For instance, it has been proposed to lessen the oxidation of the ferrous compounds into ferric compounds by not bringing together the ferrous sulfate and the alkali carbonate or hydrate until they are in the washers in which they are exposed to the cyanogen-bearing gas; but by this arrangement the alkali sulfate which is formed cannot be removed before the formation of the ferrocyanid, so that the final ferrocyanid is contaminated by the presence of the alkali sulfate. This also greatly reduces the value of the product. Moreover, in addition to its other drawbacks, this only lessens and does not even nearly entirely prevent the formation of the insoluble ferric compounds of cyanogen.

By my present invention I am enabled to obtain a substantially pure ferrocyanid, of definite composition, and to transform substantially all the cyanogen of the gas directly into this soluble ferrocyanid. I reduce the amount of the insoluble cyanogen compounds from the former 15 to 33 per cent. to a fraction of 1 per cent.; so that in effect there is only a trace of the insoluble compounds formed.

I do this by preventing practically absolutely the oxidation of the ferrous compounds into the ferric compounds.

As a result of a long series of experiments, I have discovered that this oxidation of iron from the ferrous to the ferric state is due almost wholly to two things; first, and principally, the action of the oxygen of atmospheric air on the ferrous compounds; and second, the promotion of such oxidation because of the use of heat—which is the normal method of obtaining this solution—in dissolving the ferrous sulfate, which is difficultly soluble.

By my present invention I eliminate these two causes of oxidation. In doing this, I dissolve the ferrous sulfate by mechanical agitation instead of by heat, and I keep all the ferrous solutions away from contact with the atmospheric air, and exposed only to an atmosphere of an inert gas, until after the soluble ferrocyanid has been formed. For this inert gas, I have found that the illuminating gas which is being treated by my process is extremely suitable; preferably I use such gas after it has been purified, not only by the removal of the cyanogen by my present process but by the removal of other substances, such as tar, napthalene, sulfur, and ammonia.

The accompanying drawing illustrates an apparatus used for carrying out my invention. The single figure of this drawing shows such apparatus diagrammatically.

In describing my invention in detail, I shall assume the use of sodium hydrate as the alkali and ferrous sulfate as the iron salt, though it is possible to use other alkali metals (including ammonium) or even an alkali earth (and I mean to include both alkali metals and alkali earths by the term "alkali") in place of sodium and to use it in other forms than the hydrate, such as the carbonate, and it is also possible to use other ferrous salts than the sulfate, such as the chlorid, though the ferrous sulfate is desirable commercially because of the formation as a by-product of sodium sulfate, which has a standard commercial value. When I use the term "hydroxid" in the claims, I mean to include both the hydrate and the carbonate, for the carbonate of an alkali metal or an alkali earth is alkaline in its reaction (because carbonic acid is such a weak acid), and is the equivalent of the hydrate in many reactions, including those here involved; in fact, the hydrate may be considered as being formed from the carbonate by the addition of water and with the setting free of carbonic acid.

The tank 10 is the sodium hydrate solution tank. The sodium hydrate in solid form is dissolved in water in this tank, the solution being accelerated by the injection of steam through a pipe 11, which steam both agitates and heats the solution. This tank 10 may be open to the atmosphere. Two tanks 12 and 13 are respectively the ferrous sulfate solution tank and the ferrous sulfate storage tank. These are connected near their upper ends by a pipe 14 and near their lower ends by a pipe 15, the pipe 15 near its entrance into the tank 12 being bent up to form a safety seal 16 the top of which is above the desired minimum level of the solution in the tank 12. The ferrous sulfate solution tank 12 is provided with a feed hopper 17, which has a hopper top and extends below the low liquid level in the tank 12 so as to form a seal.

The tanks 12 and 13 are not open to air, but instead are connected by pipes 18 and 19 to a gas supply line 20 receiving purified illuminating gas, so that the surface of the ferrous sulfate solution in the tanks 12 and 13 is exposed to this illuminating gas instead of to atmospheric air, whereby oxidation of the ferrous iron into the ferric state is practically wholly prevented because of the inert character of the illuminating gas. A branch from the pipe 18 also leads to the top of the safety seal 16, so as to prevent possibility of siphoning. A pump 21 is located in the pipe 15 for causing the circulation of the solution from the storage tank 13 through the pipe 15 into the tank 12 and back through the pipe 14 into the tank 13, whereby an agitation is created by which the ferrous sulfate is dissolved substantially as readily as if the solution were heated, while at the same time the oxidizing tendency of the heat is avoided and the solution takes place in the cold. The tanks 10, 12, and 13 are conveniently located beneath a charging and storage floor 22, so that the sodium hydrate and ferrous sulfate may be fed into the tanks 10 and 12 by gravity.

A pipe 25, in which is located a pump 26, leads from the sodium hydrate solution tank into a precipitation tank 27, and a pipe 28 leads from the pipe 15 between the pump 21 and the safety seal 16 to the same precipitation tank 27, valves 29 being provided in the pipes 15 and 28 for determining whether the pump 21 shall discharge to the solution tank 12 or to the precipitation tank 27. The precipitation tank 27 is also closed from the atmosphere, and is connected by a pipe 30 to the gas seal line 20 so that the liquid within it is also exposed only to an inert atmosphere. By the operation of the pumps 21 and 26, the valves 29 being properly set, the solution of sodium hydrate and ferrous sulfate may be brought together in the precipitation tank 27, where they react as shown by the following equation:

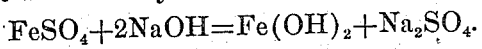
$$FeSO_4 + 2NaOH = Fe(OH)_2 + Na_2SO_4.$$

If an alkali carbonate, such as sodium carbonate, is used in place of the alkali hydrate, there are formed nevertheless the alkali sulfate and ferrous hydrate, but with the setting free of carbonic acid, as shown by the following equation:

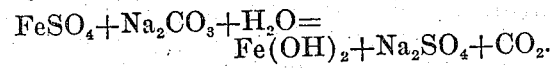
$$FeSO_4 + Na_2CO_3 + H_2O = Fe(OH)_2 + Na_2SO_4 + CO_2.$$

Either of these reactions takes place practically without the oxidation of any of the iron into the ferric state.

The ferrous hydrate thus formed settles as a light, somewhat gray green precipitate, which is free from the red brown discoloration which has heretofore always been present and has frequently predominated in the previous process by reason of the oxidation of a large proportion of the iron into the ferric state. The sodium sulfate is drawn off by decantation, and the precipitate washed so as to remove the sodium sulfate completely. Then additional sodium hydrate, conveniently from the tank 10, is added to the precipitate, and agitated sufficiently so that the precipitate, which is a ferrous hydrate sludge, is brought into suspension. This sodium hydrate solution with the ferrous sludge in suspension is pumped by a pump 31 through a pipe 32 to a feed tank 33. The intake to the pump 31 comprises a trap 34 with a riser 35 extending above the highest liquid level in the precipitation tank 27. The feed tank 33 is also sealed from the atmosphere, and is connected by a pipe 36 to the gas seal line 20, so that it is exposed only to an inert atmosphere. If desired, the upper end of the riser 35 may be similarly connected to the gas seal line 20, though this is not essential, as the amount of air which might enter the top of the riser 35 is so small that any oxidation of the iron into the ferric state by reason thereof would be practically negligible.

The sodium hydrate with the ferrous hydrate in suspension therein is drawn as desired from the feed tank 33 into a suitable washer 38, shown as a washer of the Feld type, which washer receives the cyanogen-carrying gas (freed from tar) at the bottom and discharges cyanogen-free gas at the top. As this gas comes in contact with the sodium and ferrous hydrates from the feed tank 33, there is first a reaction between such ferrous hydrate and the hydrogen sulfid in the gas, forming ferrous sulfid and water, as follows:

$$Fe(OH)_2 + H_2S = FeS + 2H_2O.$$

Immediately this ferrous sulfid and the sodium hydrate react with the hydrocyanic acid of the gas, forming sodium ferrocyanid, water, and hydrogen sulfid, as follows:

$$FeS + 4NaOH + 6HCN = Na_4Fe(CN)_6 + 4H_2O + H_2S.$$

Probably before the foregoing reaction takes place some of the sodium hydrate is converted by the carbonic acid in the gas into sodium carbonate, and this sodium carbonate combines with the ferrous sulfid and the hydrocyanic acid to produce sodium ferrocyanid, carbonic acid gas, water, and hydrogen sulfid as follows:

$$FeS + 2Na_2CO_3 + 6HCN = Na_4Fe(CN)_6 + 2CO_2 + 2H_2O + H_2S.$$

These reactions are substantially complete, removing practically the whole of the cyanogen in the gas. It takes places out of contact with the atmosphere, so that there is no oxidation of the ferrous iron into ferric iron. As a result, practically all the cyanogen thus absorbed from the gas goes immediately to form sodium ferrocyanid, or yellow prussiate of soda. If potassium hydrate is used instead of sodium hydrate in these reactions, potassium ferrocyanid, $K_4Fe(CN)_6$, or yellow prussiate of potash, is obtained. Either of these ferrocyanids is soluble, so that there are practically no insoluble cyanogen compounds formed in the reaction.

The ferrocyanid when once formed is relatively stable, and the ferrous iron in it is practically free from any tendency to pass over into the ferric state, so that from this point on it is not necessary to prevent access of air. Therefore, from this point on the system hitherto used is substantially duplicated.

The solution of sodium ferrocyanid from the washer is carried by a pipe 39 into a cooking tank 40, for driving off by heat whatever free ammonia and ammonia compounds may have been formed, such as ammonia gas, ammonium carbonate, and ammonium sulfid. The solution is then carried by a pipe 41 to a filter press 42, which removes the excess of sludge, for it is necessary to use an excess of the iron and sodium hydrates in order to insure absorption of all the cyanogen. This sludge is discharged from the filter press by a pipe 43 into the mother liquor tank 44, while the clear solution is borne by a pipe 45 from the top of the filter press into a vacuum evaporator 46, which by evaporation concentrates the solution. The concentrated solution is drawn by the pipe 47 into the first crystallization tank 48, in which crystallization is allowed to take place. If all the sodium sulfate has not been removed by decantation and washing in the precipitation tank 27, the small amount remaining crystallizes first, as a hard rock—salt cake—in the bottom of the tank, and is later separated from the more slowly forming remainder of the crystalized substance mechanically, since there is a definite line of demarcation. Then the sodium ferrocyanid crystallizes out, together with some sodium carbonate, which has been formed by the excess of sodium hydrate and the carbonic acid in the gas in the washer 38. These crystals contain approximately ninety per cent. (90%) of sodium ferrocyanid. There are then dissolved and carried by a pipe 49 into the second crystallization tank 50, in which a second crystallization is obtained, producing crystals which contain over ninety-eight per cent. (98%) of sodium ferrocyanid. This fractional crystallization may be continued further, if desired, to obtain crystals of any desired degree of purity, though for ordinary purposes two crystallizations are sufficient. The crystals thus produced are freely soluble, are substantially pure for commercial purposes, are of substantially definite composition, and have a definite and relatively high commercial value, whether the metal is sodium or potassium, or ammonium or other alkali metal or alkali earth, though I believe the sodium and potassium products are at present preferable over any of the others.

The mother liquor from the crystallization tanks 48 and 50 is carried by a pipe 51 into the mother liquor tank 44, from which the mother liquor and sludge may be drawn by a pipe 52 and a pump 53 and carried back into the feed tank 33 for re-use.

I claim as my invention:

1. The process of recovering cyanogen from illuminating gas, which comprises dissolving a ferrous salt by agitation in the cold, mixing the solution thus formed with a solution of an alkali hydroxid, removing the solution of the resultant alkali salt from the resultant insoluble ferrous hydrate, adding an excess of a solution of an alkali hydroxid to said resultant insoluble ferrous hydrate, exposing subsequently to the removal of said resultant alkali salt the mixture of such excess of the alkali hydroxid solution and the aforesaid resultant insoluble ferrous hydrate to the cyanogen-bearing gas, and maintaining the ferrous materials always out of contact with oxygen from before the initial dissolving of the ferrous salt until after the reaction with the cyanogen-bearing gas.

2. The process of recovering cyanogen from illuminating gas, which comprises dissolving a ferrous salt, mixing the solution thus formed with a solution of an alkali hydroxid, removing the solution of the resultant alkali salt from the resultant insoluble ferrous hydrate, adding an excess of a solution of an alkali hydroxid to said resultant insoluble ferrous hydrate, exposing subsequently to the removal of said resultant alkali salt the mixture of such excess of the alkali hydroxid solution and the aforesaid resultant insoluble ferrous hydrate to the cyanogen-bearing gas, and maintaining the ferrous materials always out of contact with oxygen from before the initial dissolving of the ferrous salt until after the reaction with the cyanogen-bearing gas.

3. The process of recovering cyanogen from illuminating gas, which comprises dissolving a ferrous salt by agitation in the cold, mixing the solution thus formed with a solution of an alkali hydroxid, removing the solution of the resultant alkali salt from the resultant insoluble ferrous hydrate, adding an excess of a solution of an alkali hydroxid to said resultant insoluble ferrous hydrate, exposing subsequently to the removal of said resultant alkali salt the mixture of such excess of the alkali hydroxid solution and the aforesaid resultant insoluble ferrous hydrate to the cyanogen-bearing as, and maintaining the ferrous materials under the seal of an inert gas from before the initial dissolving of the ferrous salt until after the reaction with the cyanogen-bearing gas.

4. The process of recovering cyanogen from illuminating gas, which comprises dissolving a ferrous salt, mixing the solution thus formed with a solution of an alkali hydroxid, removing the solution of the resultant alkali salt from the resultant insoluble ferrous hydrate, adding an excess of a solution of an alkali hydroxid to said resultant insoluble ferrous hydrate, exposing subsequently to the removal of said resultant alkali salt the mixture of such excess of the alkali hydroxid solution and the aforesaid resultant insoluble ferrous hydrate to the cyanogen-bearing gas, and maintaining the ferrous materials under the seal of an inert gas from before the initial dissolving of the ferrous salt until after the re-action with the cyanogen-bearing gas.

5. The process of recovering cyanogen from illuminating gas, which comprises dissolving ferrous sulfate by agitation in the cold, mixing the solution of the ferrous sulfate thus formed with a solution of an alkali hydroxid, removing the solution of the resultant alkali sulfate from the resultant insoluble ferrous hydrate, adding an excess of a solution of an alkali hydroxid to said resultant insoluble ferrous hydrate, exposing subsequently to the removal of said resultant alkali sulfate the mixture of such excess of the alkali hydroxid solution and the aforesaid resultant insoluble ferrous hydrate to the cyanogen-bearing gas, and maintaining the ferrous materials always out of contact with the oxygen from before the initial dissolving of the ferrous sulfate until after the reaction with the cyanogen-bearing gas.

6. The process of recovering cyanogen from illuminating gas, which comprises dissolving ferrous sulfate, mixing the solution of the ferrous sulfate thus formed with a solution of an alkali hydroxid, removing the solution of the resultant alkali sulfate from the resultant insoluble ferrous hydrate, adding an excess of a solution of an alkali hydroxid to said resultant insoluble ferrous hydrate, exposing subsequently to the removal of said resultant alkali sulfate the mixture of such excess of the alkali hydroxid solution and the aforesaid resultant insoluble ferrous hydrate to the cyanogen-bearing gas, and maintaining the ferrous materials always out of contact with the oxygen from before the initial dissolving of the ferrous sulfate until after the reaction with the cyanogen-bearing gas.

7. The process of recovering cyanogen from illuminating gas, which comprises dissolving ferrous sulfate by agitation in the cold, mixing the solution of the ferrous sulfate thus formed with a solution of an alkali hydroxid, removing the solution of the resultant alkali sulfate from the resultant insoluble ferrous hydrate, adding an excess of a solution of an alkali hydroxid to said resultant insoluble ferrous hydrate, exposing subsequently to the removal of said resultant alkali sulfate the mixture of such excess of the alkali hydroxid solution and the aforesaid resultant insoluble ferrous hydrate to the cyanogen-bearing gas, and maintaining the ferrous materials under the seal of an inert gas from before the initial dissolving of the ferrous sulfate until after the reaction with the cyanogen-bearing gas.

8. The process of recovering cyanogen from illuminating gas, which comprises dissolving ferrous sulfate, mixing the solution of the ferrous sulfate thus formed with a solution of an alkali hydroxid, removing the solution of the resultant alkali sulfate from the resultant insoluble ferrous hydrate, adding an excess of a solution of an alkali hydroxid to said resultant insoluble ferrous hydrate, exposing subsequently to the removal of said resultant alkali sulfate the mixture of such excess of the alkali hydroxid solution and the aforesaid resultant insoluble ferrous hydrate to the cyanogen-bearing gas, and maintaining the ferrous materials under the seal of an inert gas from before the initial dissolving of the ferrous sulfate until after the reaction with the cyanogen-bearing gas.

In witness whereof, I have hereunto set my hand at Indianapolis, Indiana, this thirteenth day of February, A. D. one thousand nine hundred and seventeen.

WILLIAM H. WRIGHT.